No. 821,866. PATENTED MAY 29, 1906.
C. DOBBS & J. R. PITMAN.
MACHINE FOR MAKING COMB POWDER.
APPLICATION FILED JUNE 28, 1905.

3 SHEETS—SHEET 1.

Witnesses:
Henry Drury
M. M. Hamilton

Inventors
Charles Dobbs &
John R. Pitman

No. 821,866. PATENTED MAY 29, 1906.
C. DOBBS & J. R. PITMAN.
MACHINE FOR MAKING COMB POWDER.
APPLICATION FILED JUNE 28, 1905.
3 SHEETS—SHEET 2.
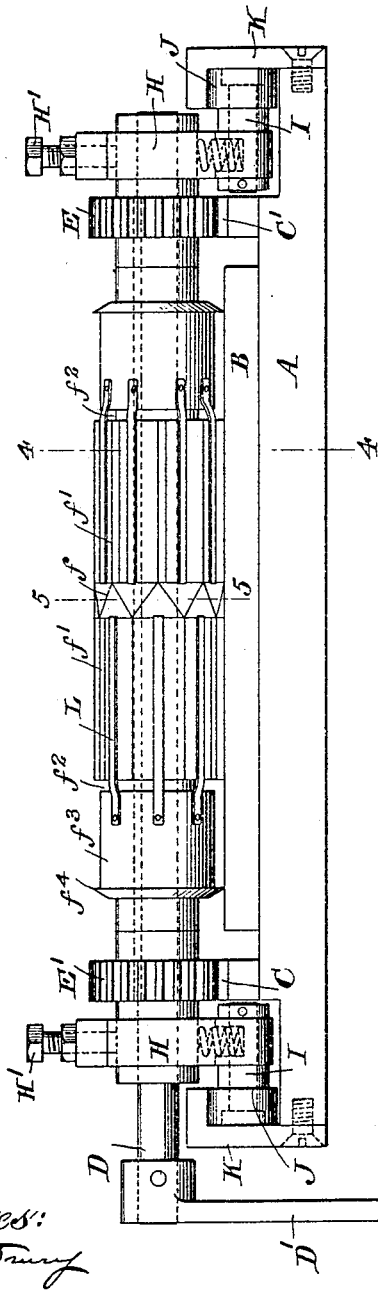
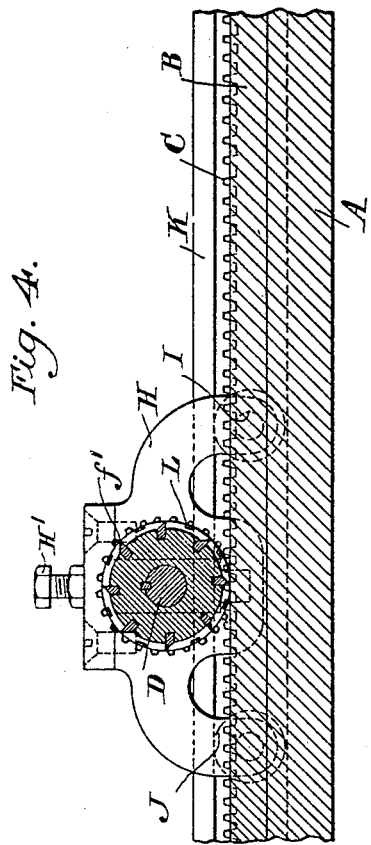
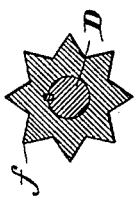
Witnesses:
Inventors:

No. 821,866. PATENTED MAY 29, 1906.
C. DOBBS & J. R. PITMAN.
MACHINE FOR MAKING COMB POWDER.
APPLICATION FILED JUNE 28, 1905.

3 SHEETS—SHEET 3.

Witnesses:
Henry Drury
M. M. Hamilton

Inventors
Charles Dobbs
John R. Pitman

UNITED STATES PATENT OFFICE.

CHARLES DOBBS AND JOHN R. PITMAN, OF HASKELL, NEW JERSEY, ASSIGNORS TO THE E. I. DU PONT DE NEMOURS POWDER COMPANY, OF WILMINGTON, DELAWARE, A CORPORATION OF NEW JERSEY.

MACHINE FOR MAKING COMB-POWDER.

No. 821,866.

Specification of Letters Patent.

Patented May 29, 1906.

Application filed June 28, 1905. Serial No. 267,329.

*To all whom it may concern:*

Be it known that we, CHARLES DOBBS and JOHN R. PITMAN, citizens of the United States, residing at Haskell, county of Passaic, and State of New Jersey, have invented a new and useful Improvement in Machines for Making Comb-Powder, of which the following is a full, clear, and exact description, reference being had to the accompanying drawings, which form a part of this specification.

Our invention has for its object the production of a machine by the use of which comb-powder may be formed.

We will first describe the embodiment of our invention as illustrated in the accompanying drawings and then point out the invention in the claims.

Figure 1:
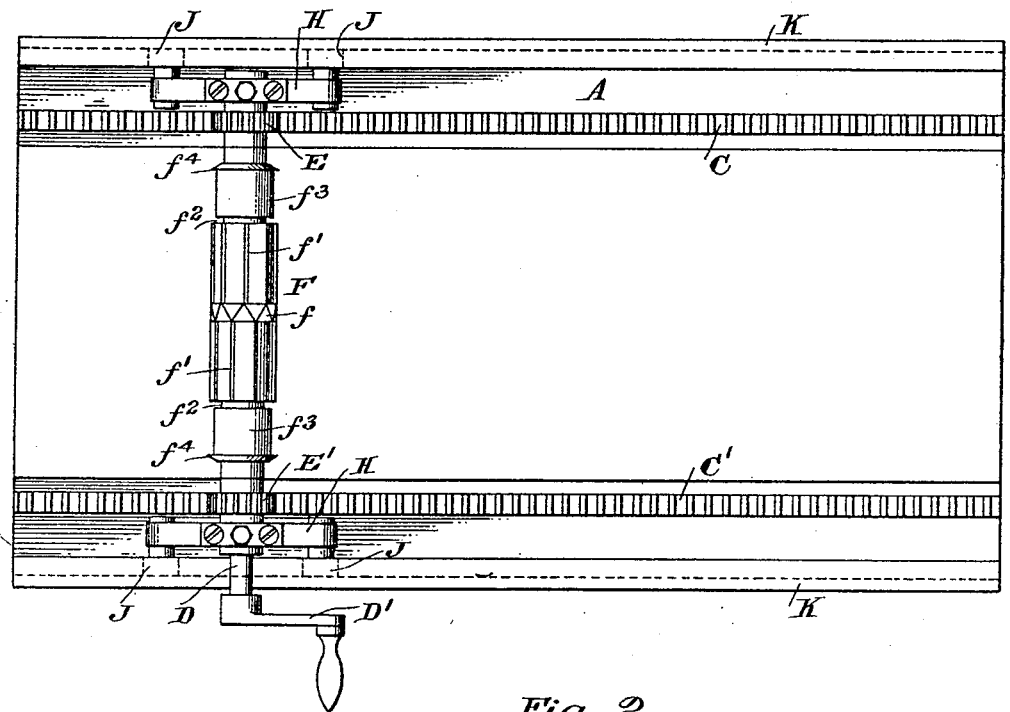
Figure 2:
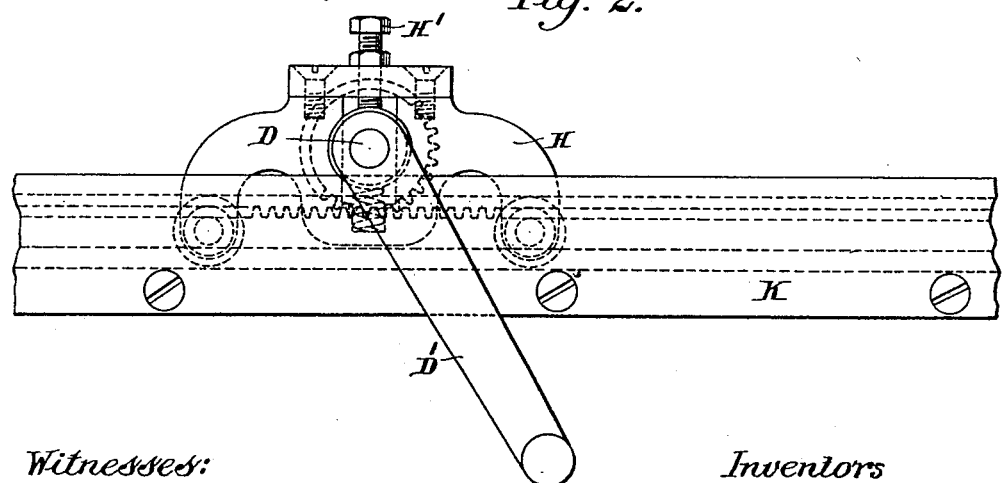
Figure 6:
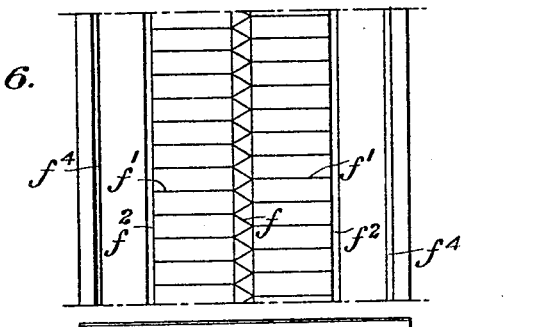
Figure 7:
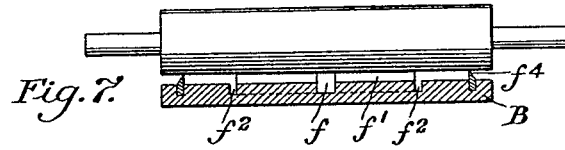
Figure 9:
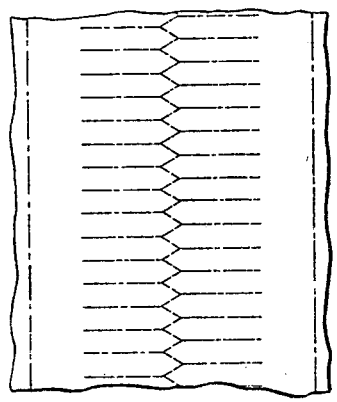
Figure 8:
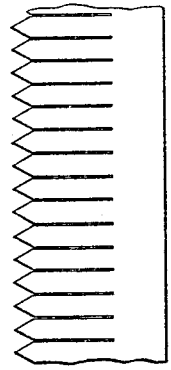

In the drawings, Figure 1 is a plan view of the machine. Fig. 2 is a side elevation thereof. Fig. 3 is an end elevation. Fig. 4 is a longitudinal sectional view on the line 4 4, Fig. 3. Fig. 5 is a cross-section through the central cutter on the line 5 5, Fig. 3. Fig. 6 is a plan view of a modified form of bed. Fig. 7 is a sectional view thereof. Fig. 8 is a view showing a block or plate of comb-powder. Fig. 9 is a view showing a double block or plate of comb-powder, and Fig. 10 is an elevation of a modified form of cutting-roll.

A is the base, upon which is secured or formed the bed B and also the racks C C'.

D is a shaft having crank D'. To this shaft D are secured the pinions E E', one of each meshing with a corresponding rack. Secured upon this shaft D is the roll F, which is a double roll to form the double comb-plate, as shown in Fig. 9. The roll F is therefore essentially a double roll, having at one end of each roll angular cutting edges $f$, from which extend longitudinal cutting edges $f'$, equispaced around the periphery of the roll a distance apart equal to the desired distance between comb-prongs. At the end of these longitudinal cutting edges opposite the angular cutting edges is formed a cut-away portion or pocket $f^2$, which pocket is quite advantageous for removal of the cut powder. Beyond this pocket is the plain surface $f^3$ in a lower plane than the cutting edges $f'$. At the outer end of this surface $f^3$ is the circular cutting edge $f^4$, which cutting edge is in the same plane as the cutting edge $f'$.

Figure 10:
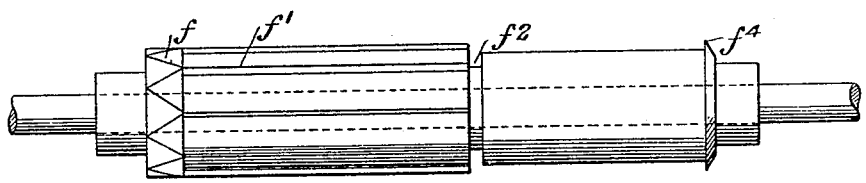

In case only a single comb-powder block or strip is to be made we use the roll such as is shown in Fig. 10.

Mounted in the spring-bearings H, controlled by the screws H', are the shafts I, each having rollers J, which run on tracks K, secured to the base A.

The block or strip of powder to be formed into comb-powder is placed upon the bed B and the roll F passed over it by turning the crank, the proper pressure being obtained by means of the screws H'.

Instead of forming the cutting edges on the roll F we can use a plain-faced roller, as shown in Fig. 7, and place the cutting edges, cut-away portion, and lower plain surface, which in Fig. 1 is upon the roller, upon the bed B, as also shown in Fig. 7.

When we place the cutting edges upon the roller, we prefer to use spring-fingers L, which lie or rest upon the roll between the longitudinal cutting edges $f'$, this to hold the powder from hugging too closely to the roll.

We do not in this application claim, broadly the cutting device or the cutting-roll here shown and described, as we have illustrated described, and claimed such a cutting device and cutting-roll in an application contemporaneously filed by us with this application and bearing filing date of June 28, 1905, and being serially numbered 267,328.

Having now fully described our invention, what we claim, and desire to protect by Letters Patent, is—

1. In a machine for forming comb-powder, in combination, a bed-plate adapted to receive the powder block or strip and a roller, one of said devices having angular cutting edges forming one end and straight cutting edges extending therefrom, a cut-away portion or pocket beyond straight cutting edges, and means to cause said roller to rotate and travel over said bed-plate.

2. In a machine for forming comb-powder, in combination, a bed-plate adapted to receive the powder block or strip and a roller, one of said devices having angular cutting edges forming one end and straight cutting edges extending therefrom, a cut-away portion or pocket beyond said straight cutting edges, a plain surface beyond said cutting edges and at a lower plane than said cutting edges, means to cause said roller to rotate and travel over said bed-plate.

3. In a machine for forming comb-powder, in combination, a bed-plate adapted to receive the powder block or strip and a roller, one of said devices having angular cutting edges forming one end and straight cutting edges extending therefrom, and a plain surface beyond said cutting edges and at a lower plane than said cutting edges, and a cutting edge at the end of said last-mentioned surface in the same plane as the last-mentioned cutting edges, and means to cause said roller to rotate and travel over said bed-plate.

4. In a machine for forming comb-powder, in combination, a bed-plate adapted to receive the powder block or strip and a roller, one of said devices having angular cutting edges forming one end and straight cutting edges extending therefrom, and a cut-away portion or pocket beyond said straight cutting edges, a plain surface beyond said cutting edges and at a lower plane than said cutting edges, a cutting edge at the end of said last-mentioned surface in the same plane as the last-mentioned cutting edges, and means to cause said roller to rotate and travel over said bed-plate.

In testimony of which invention we have hereunto set our hands, at Haskell, New Jersey, on this 21st day of June, 1905.

CHARLES DOBBS.
JOHN R. PITMAN.

Witnesses:
GEO. W. COLFAX,
J. W. ACKERMAN, Jr.